United States Patent
Baldischweiler

(10) Patent No.: US 12,488,212 B2
(45) Date of Patent: Dec. 2, 2025

(54) CARD BODY FOR A CHIP CARD, AND CHIP CARD

(71) Applicant: GIESECKE+DEVRIENT EPAYMENTS GMBH, Munich (DE)

(72) Inventor: Michael Baldischweiler, Munich (DE)

(73) Assignee: GIESECKE+DEVRIENT EPAYMENTS GMBH, Munich (DE)

( * ) Notice: Subject to any disclaimer, the term of this patent is extended or adjusted under 35 U.S.C. 154(b) by 99 days.

(21) Appl. No.: 18/272,645

(22) PCT Filed: Jan. 25, 2022

(86) PCT No.: PCT/EP2022/025022
§ 371 (c)(1),
(2) Date: Jul. 17, 2023

(87) PCT Pub. No.: WO2022/161738
PCT Pub. Date: Aug. 4, 2022

(65) Prior Publication Data
US 2025/0077824 A1    Mar. 6, 2025

(30) Foreign Application Priority Data
Jan. 26, 2021 (DE) ............ 10 2021 000 384.5

(51) Int. Cl.
*G06K 19/00* (2006.01)
*C22C 38/00* (2006.01)
*C22C 38/16* (2006.01)
*G06K 19/02* (2006.01)

(52) U.S. Cl.
CPC ............ *G06K 19/02* (2013.01); *C22C 38/002* (2013.01); *C22C 38/16* (2013.01)

(58) Field of Classification Search
CPC ........ G06K 19/02; C22C 38/002; C22C 38/16
USPC ............................................ 235/492
See application file for complete search history.

(56) References Cited

U.S. PATENT DOCUMENTS

| 2014/0209691 A1 | 7/2014 | Finn et al. |
| 2020/0257953 A1 | 8/2020 | Lotya et al. |
| 2020/0387768 A1 | 12/2020 | Lotya et al. |

FOREIGN PATENT DOCUMENTS

WO    2019136436 A2    7/2019

OTHER PUBLICATIONS

"Chemical Composition of Steel" by Esther Mar | Sep. 28, 2017 https://www.baileymetalprocessing.com/techmatters/blog-category-1/2017/09/28/chemical-composition-of-steel.*
"Materials Science Metal/ Iron and Steel/ Standards and Alloys", Online Encyclopedia "Wikibooks", URL: https://de.wikibooks.org/w/index.php?title=Werkstoffkunde_Metall/_Eisen_und_Stahl/_Normen_und_Legierungen&oldid=913258, from May 17, 2020, Page last edited May 17, 2020, accessed Sep. 13, 2021.
German Search Report from corresponding German Application No. DE 102021000384.5, Sep. 13, 2021.
International Search Report from corresponding PCT Application No. PCT/EP2022/025022, May 6, 2022.

* cited by examiner

*Primary Examiner* — Daniel A Hess
(74) *Attorney, Agent, or Firm* — Workman Nydegger

(57) ABSTRACT

A card body for a chip card, includes a metal layer made of a steel alloy. The steel alloy of the metal layer contains 0.07 to 4 wt. % of carbon, and/or the steel alloy of the metal layer contains 0.01 to 0.3 wt. % of sulfur.

10 Claims, 2 Drawing Sheets

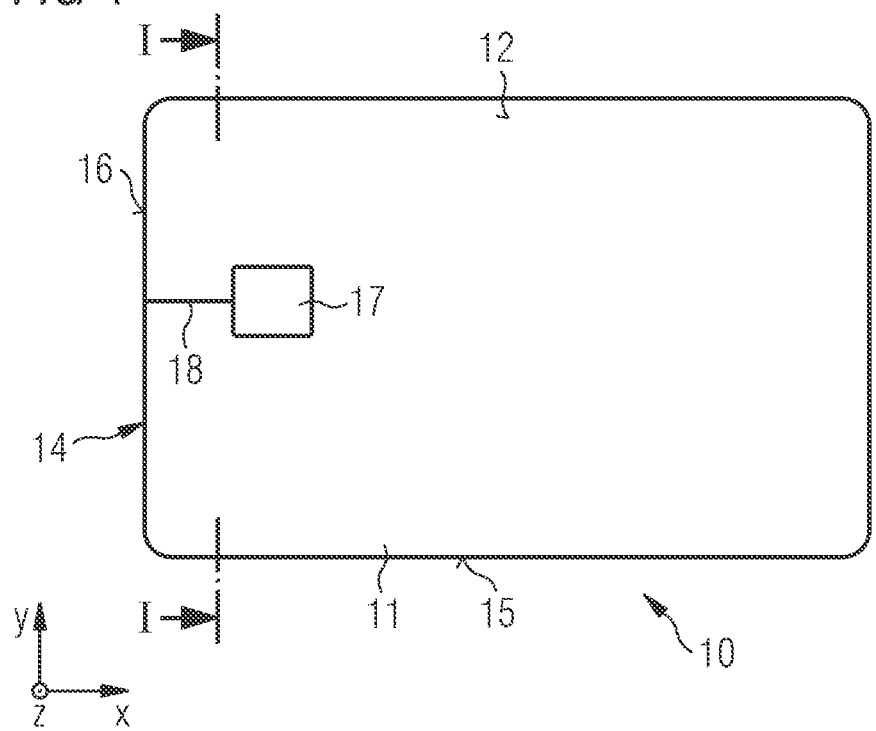
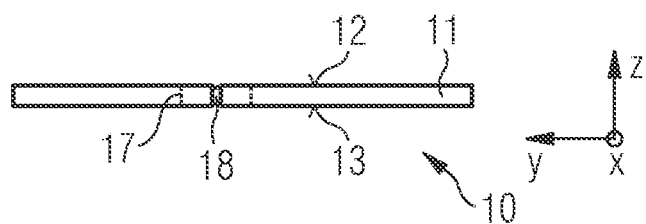

CARD BODY FOR A CHIP CARD, AND CHIP CARD

BACKGROUND

The invention relates to a card body for a chip card and to a chip card comprising a card body.

Card bodies are contemplated which have a metallic core in the form of a metallic core layer or a metallic core element, and also cards with dual interface (DI) functionality, in which the card body consists partly or entirely of metal. The energy coupling of DI systems with a two-coil system (SPS) is accomplished typically through metal structures having a slot through which the magnetic/current flow is diverted into the metal faces. In this way, the slot prevents a short-circuit current.

The chip module is inserted into a cavity or module opening of the card body.

The operation of such a card involves the use of a chip module which itself contains a coil (coil on module). This coil couples to the metallic card body.

Eddy currents are developed, their extent depending on the metal used. The eddy currents themselves absorb part of the energy given off by the reader. This energy is then no longer available for the chip card controllers. In bulky or extensive pieces of metal, the flow direction of eddy currents is subject to turbulent changes. Although the eddy currents do not possess a spatially fixed direction, they are subject to Lenz's law, according to which eddy currents oppose the cause of their formation. Moreover, the chip card is also subject to the skin effect.

SUMMARY

It is an object of the present invention, therefore, to improve the coupling of energy into the card body and the chip card.

This object is achieved by a card body for a chip card, or a chip card comprising a card body, according to the independent claims of the patent. Refinements and developments of the invention are specified in the dependent claims.

A card body of the invention for a chip card, having a metallic layer composed of a steel alloy, envisages that the steel alloy of the metallic layer contains carbon with a mass fraction of 0.07% to 4%, preferably 0.1% to 3%, and/or that the steel alloy of the metallic layer contains sulfur with a mass fraction of 0.01% to 0.1%, preferably 0.02% to 0.04%.

A basic concept of the present invention is that an alloy for a metallic layer or a metallic card body is provided which has an extremely low internal resistance or specific resistance. As a result, the losses due to the eddy currents are reduced. Furthermore, the skin effect can be diminished. Normally, in a steel alloy or stainless steel alloy, carbon would not be provided in a substantial mass fraction, since it makes the steel brittle and more susceptible to corrosion. In the specific field of application here, of chip cards, it is possible to depart from this common received opinion, because the usual loading of the steel in the case of chip cards does not reach the limits of stability and the metallic layer can be clad with plastic.

The card body proposed here therefore has the advantage that the coupling of energy into the metal card is substantially improved, so boosting the performance in the chip card. One effect of reducing the eddy currents is to enable a rapid development of the magnetic field strength at a coil of the chip module, allowing the chip or the processor to start more quickly. Another effect is to enable a higher magnetic field strength at a coil of the chip module, which permits more rapid operation owing to a higher operating frequency of the chip or the processor.

Provision may be made for the steel alloy to be a stainless steel alloy having the designation 1.43.01. This stainless steel alloy may also be denoted X5CrNi18 10 and is an austenitic chromium-nickel steel.

Provision may further be made for the steel alloy of the metallic layer to contain copper with a mass fraction of 0.01% to 5%, preferably 0.1% to 1%. Through the additional introduction of copper it is possible to achieve further reductions in the specific resistance and also in the loss due to eddy currents, hence allowing the performance of the chip to be increased further. Here again, it is possible to depart from the common received opinion, because the usual loading of the steel does not reach the limits of stability.

Provision may be made for there to be a slot in the metallic layer between an edge of the metallic layer and the module opening. The slot reduces eddy currents and may prevent a short-circuit current.

Provision may further be made for there to be a respective plastic outer layer on two main faces of the metallic layer. The plastic outer layers protect the metallic layer and offer opportunities for visual design.

Provision may be made for there to be a module opening in the metallic layer for receiving a chip module. This module opening may likewise be formed, partly or entirely, in the plastic outer layers. The module opening may be a through-hole or a blind hole.

A chip card of the invention comprises a card body as described above, with or without plastic outer layers, and a chip module embedded at least partly into the module opening of the card body. The advantages and modifications which apply are the same as described above.

Provision may be made for the chip module to comprise a coil and a chip. Via the coil, with its windings, the chip is supplied with energy and/or signals.

BRIEF DESCRIPTION OF THE DRAWINGS

The present invention is described below illustratively with reference to the appended drawings, in which FIG. 1 shows a plan view of a card body for a chip card;

FIG. 2 shows a sectional representation of the card body from FIG. 1 according to the line I-I.

DETAILED DESCRIPTION OF VARIOUS EMBODIMENTS

Figure 3:
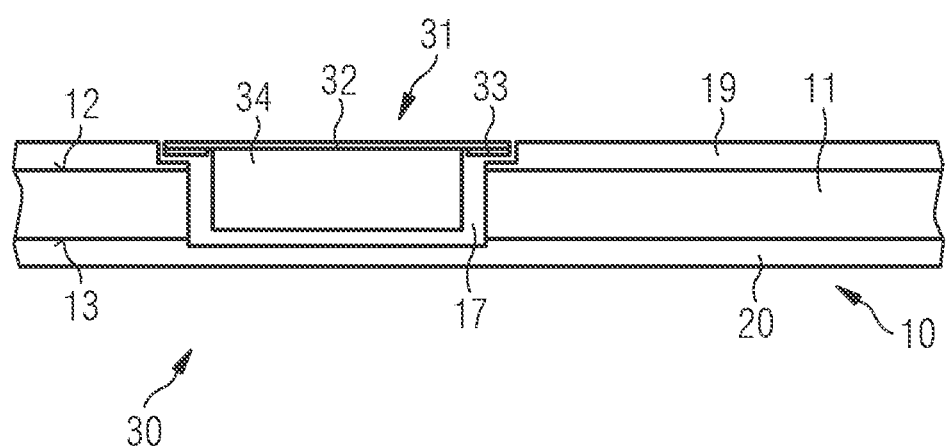
FIG. 3 shows a sectional representation of a chip card with card body and chip module.

FIG. 1 shows a card body 10 for a chip card. The card body 10 has a metallic base element 11 with two opposite main faces, of which one main face 12 is visible in FIG. 1. The other, opposite main face 13 is represented in FIG. 2. The two main faces 12, 13 run parallel to one another and are connected by a peripheral face 14 running round.

The metallic base element 11 has a rectangular form in an x-y plane, in which the peripheral face 14 lies with two longitudinal faces 15 running in the x-direction and two end faces 16 running in the y-direction. The thickness of the base element 11 extends in the z-direction.

The metallic base element 11 may take the form, for example, of a core or of a layer composed of a steel alloy or stainless steel alloy such as V2A 1.43.01 with a thickness for example of 400 µm. The thickness of the base element 11 may amount for example to between 50 µm and 920 µm.

The steel alloy or stainless steel alloy of the metallic layer 11 may contain carbon with a mass fraction of 0.07% to 4%, preferably 0.1% to 3%, and/or sulfur with a mass fraction of 0.01% to 0.3%, preferably 0.02% to 0.04%.

As a result of the higher carbon content, the specific resistance of the alloy can be lowered, thereby reducing the losses due to eddy currents. The mechanical or structural disadvantages brought about by the high carbon content here, such as increased brittleness in particular, can be disregarded in the context of card bodies 10 and chip cards.

It has emerged experimentally that a relatively low sulfur content likewise reduces the losses due to eddy currents. In a steel alloy, sulfur in the iron forms the iron sulfide FeS. This sulfide represents what is called a nonmetallic inclusion. Although sulfur in general as an accompanying element is unwanted in the steel, owing to the disadvantages of mechanical properties, it is employed here profitably for a card body 10 and a chip card.

A combination of the above carbon contents with the above sulfur contents also reduces the losses due to eddy currents. In the context of the present invention it has emerged that optimizing the material for reducing the losses due to eddy currents follows entirely different criteria than the customary mechanical optimization of the steels, so resulting in different alloys.

The steel alloy or stainless steel alloy of the metallic layer 11 may contain copper with a mass fraction of 0.01% to 5%, preferably 0.1% to 1%.

As a result of the higher copper content, the specific resistance of the alloy can be lowered, thereby reducing the losses due to eddy currents. A combination of the above copper contents with the above carbon contents and/or sulfur contents also reduces the losses due to eddy currents.

The above specifications for the mass fractions of carbon, sulfur and copper may be regarded as additive specifications for stainless steel alloys such as, for example, the stainless steel alloy 1.43.01. This means that the other alloy fractions apart from carbon, sulfur and copper can correspond to the stainless steel alloy 1.43.01 and that the alloy fractions of carbon, sulfur and/or copper correspond to those stated above.

A module opening 17 for a chip module is made in the main face 12 of the card body 10. The module opening 17 extends here through the entire metallic base element 11, but may also be embodied as a blind hole opening. It may also be generated not until later. The module opening 17 is produced, for example, by means of a laser operation or milling operation.

For the production of the card bodies 10, the metallic alloy described may be rolled out, for example, to form a sheet blank or a plate. From this plate, the individual card bodies 10 or base elements 11 are then milled or cut from the sheet by means, for example, of laser or water-cutting.

Provided in the metallic base element 11 is a slot 18, which extends from the peripheral face 14 or, in other words, from an outer border of the metallic base element 11 to the module opening 17. The slot 18 therefore connects the module opening 17 to the peripheral face 14. The slot 18 runs in the y-direction, i.e., parallel to the longitudinal face 15. The slot 18 has for example a width of between 30 µm and 100 µm, preferably between 50 µm and 80 µm.

In FIG. 1 the slot 18 is represented on a left-hand side. The slot 18 may also be disposed at a right-hand, top or bottom side of the base element 11. The purpose of the slot 18 is to prevent short-circuit currents and/or eddy currents.

FIG. 2 shows a sectional representation of the card body 10 according to line I-I from FIG. 1. It can be seen that the slot 18 cuts right through the base element 11 in the thickness or height, in other words in the z-direction. The slot 18 therefore connects the two main faces 12, 13. In the y-direction, the slot 18 extends up to the module opening 17.

FIG. 3 shows a sectional representation of a chip card 30 having a card body 10 as described above and a chip module 31.

The card body 10 embraces the base element 11 in the form, for example, of a metallic layer in the form of a core or a layer of a stainless steel alloy having a thickness of 400 µm.

A main face 12 or surface of the base element 11 is covered or laminated with a plastic layer 19. An opposite, second main face 13 or surface of the base element 11 is covered or laminated with a further plastic layer 20. The two plastic layers 19, 20 may consist, for example, of PET, PC, PVC or PP and have a thickness of 200 µm. The thickness of the overall card body 10 ought not to exceed the maximum thickness of a chip card body in accordance with ISO 7810.

The module opening 17 is made in the main side or surface of the card body 10. The module opening 17 extends through the entire plastic layer 19, through the entire metallic base element 11, and through part of the plastic layer 20. The module opening 17 is produced, for example, by means of a laser operation or milling operation.

The chip module 31 is disposed in the module opening 17, where it is bonded adhesively, for example. The chip module 31 comprises a contact face structure 32, which carries a coil 33. The contact face structure 32 lies on the plastic layer 19 in a border region of the module opening 17.

The chip module 31 further comprises a chip 34, which is secured, for example, in an encapsulating compound at a bottom side of the contact face structure 32. Via the coil 33, the chip 34 is supplied with energy and/or signals. Hence an electromagnetic field emerging from the metallic base element 11 can be coupled into the coil 33.

The here-proposed steel alloy or stainless steel alloy of the metallic layer 11 enables boosting of the energy absorbed by the coil 33, since the energy losses generated by eddy currents are reduced.

As a result of the reduction in the eddy currents, one effect is to enable rapid buildup of the magnetic field strength at the coil 33 of the chip module 31, which allows the processor or the chip 34 to start more rapidly. Furthermore, a higher magnetic field strength is enabled at a coil 33 of the chip module 31, and this permits more rapid operation owing to a higher operating frequency of the processor or the chip 34.

The invention claimed is:

1. A card body for a chip card, having a metallic layer composed of a steel alloy, wherein the steel alloy of the metallic layer contains carbon with a mass fraction of 0.07% to 4%, and in that the steel alloy of the metallic layer contains sulfur with a mass fraction of 0.02% to 0.04%.

2. The card body according to claim 1, wherein the steel alloy is a stainless-steel alloy having the designation 1.43.01.

3. The card body according to claim 1, wherein the steel alloy of the metallic layer contains copper with a mass fraction of 0.01% to 5%.

4. The card body according to claim 1, wherein there is a slot in the metal layer between an edge of the metallic layer and the module opening.

5. The card body according to claim 1, wherein there is a respective plastic outer layer on two main faces of the metallic layer.

6. The card body according to claim 1, wherein there is a module opening in the metallic layer for receiving a chip module.

7. A chip card comprising a card body according to claim 6 and a chip module embedded at least partly into the module opening of the card body.

8. The chip card according to claim 6, wherein the chip module comprises a coil and a chip.

9. A card body for a chip card, having a metallic layer composed of a steel alloy, wherein the steel alloy of the metallic layer comprises a stainless-steel alloy having the designation 1.43.01 with additive specifications comprising carbon with a mass fraction of 0.07% to 4%, sulfur with a mass fraction of 0.02% to 0.04%, and copper with a mass fraction of 0.01% to 5%.

10. The card body according to claim 9, wherein the additive specifications comprise carbon with a mass fraction of 0.1% to 3%, sulfur with a mass fraction of 0.02% to 0.04%, and copper with a mass fraction of 0.1% to 1%.

\* \* \* \* \*